United States Patent Office 3,540,808
Patented Nov. 17, 1970

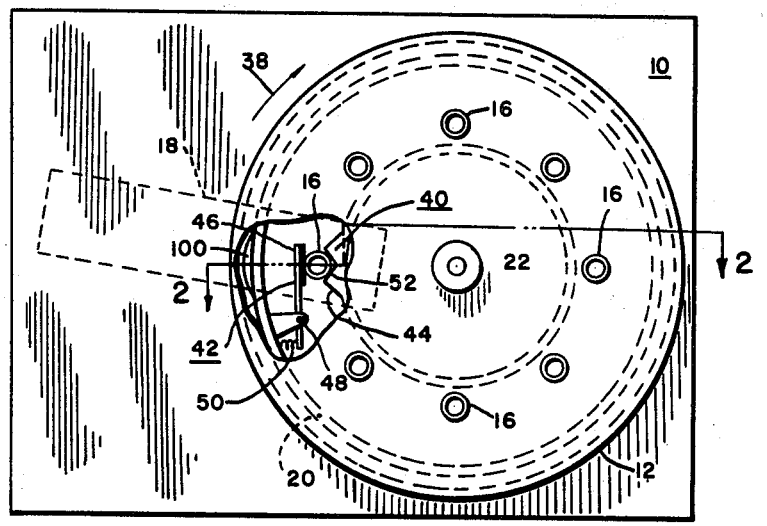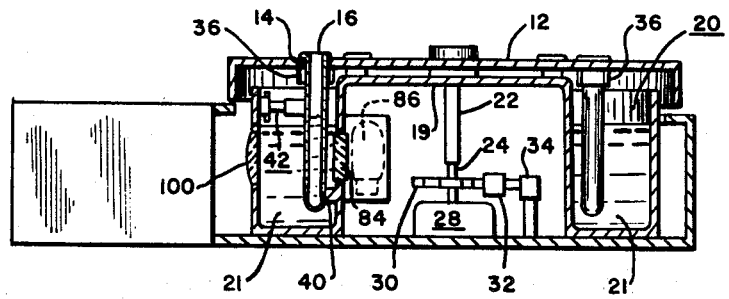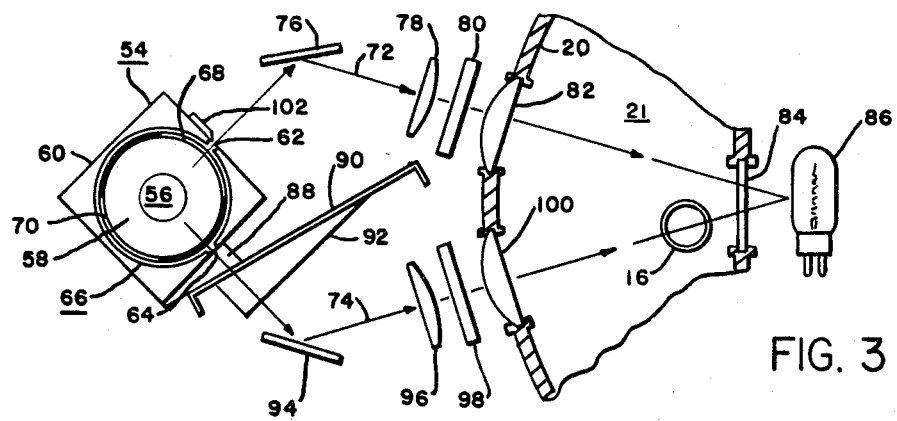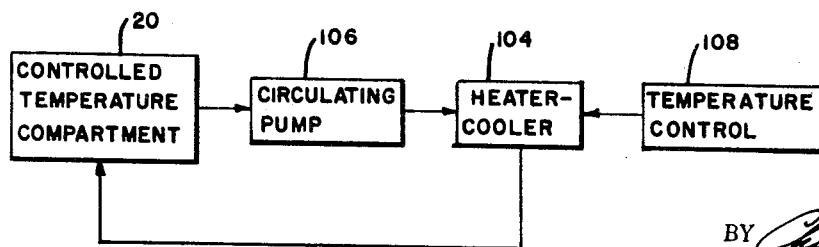

1

3,540,808
APPARATUS FOR EFFICIENTLY DIRECTING A BEAM OF RADIATION THROUGH A TEST SAMPLE
Duane D. Harmon and James M. Thoburn, Irondequoit, N.Y., assignors to Bausch & Lomb Incorporated, Rochester, N.Y., a corporation of New York
Filed Mar. 30, 1966, Ser. No. 538,743
Int. Cl. G01n 1/00, 33/16; G01i 3/46
U.S. Cl. 356—36
6 Claims

ABSTRACT OF THE DISCLOSURE

Apparatus for directing a beam of radiation through a test sample and a container therefor, both of which are at least partially immersed in a constant temperature bath. The bath chamber's walls include at least one collective lens and a filter as portions thereof. The respective refractive indexes of the test sample, the test sample container and the bath liquid are selected to approach one another so that refraction of the beam is held to an absolute minimum. In addition, resilient means urge the test sample container and its contents into precise alignment with the beam of radiation to avoid or significantly reduce the scattering thereof due to any focal effects introduced by the curvature of the sample container surfaces.

This invention relates to optical systems for testing liquid samples and, more particulary, to optical systems, including a temperature controlled sample chamber, for focusing a beam of radiation on a liquid sample.

In photometric apparatus for analyzing the concentration, density, transmission, or absorption characteristics of a liquid test sample, it is generally desirable to maintain the samples at a constant temperature. This is particularly true with instruments used to monitor the kinetic reaction rate of reagents entered into a chemical or physical process. For example, in the kinetic analysis of the enzyme concentration in blood serum, a sample of the blood serum is entered into a chemical reaction wherein the enzymes in the blood serum act as catalysts. Such a chemical reaction is described in an article by Henry et al. in the "American Journal of Chemical Pathology," vol. 34, No. 4, October 1960, pages 381–398. Since the reaction rate of a process is generally a function of the reagents therein and also the temperature to which the process is exposed, by holding the temperature constant the rate of the reaction proceeds in accordance with the concentration reagents therein (such as the concentration of enzymes in a sample of blood serum). In the case of measuring the concentration of such enzymes, the sample temperature should be controlled to approximately ±0.1° C. at the time of the testing.

In photometric apparatus for testing such liquid samples, a beam of radiation is generally applied to the sample and its reaction thereto is measured by a photosensitive device. It is well known that photosensitive devices are notoriously non-uniform regarding spatial sensitivity wherein its sensitivity varies according to the portion of the surface irradiated. Any change in the portion of the surface irradiated resulting from the insertion of a sample in the optical path of the beam results in a change of system sensitivity thereby introducing errors in the test.

If the test sample and container have indices of refraction that are substantially different from that of the medium in the sample compartment (such as air), the sample and container exhibit focal properties similar to that of a lens, causing the beam to impinge on a different portion of the radiation sensitive device than that focused upon without the sample and container. The problem is further aggravated if a cylindrical shaped sample container is employed, such as a test tube. With such cylindrical shaped surfaces it is difficult to align the center of the container with the beam so that the rays impinge on the surface of the container as closely to an angle normal to the surface as possible. If the rays impinge on the surface of the cylindrical container other than normal, the focal effect of the container becomes more prominent.

In the case of the automatic testing of small samples, such as blood serum, it is advantageous to contain the samples in individual containers, such as transparent cuvettes, so that they can be inserted sequentially into the beam of radiation for testing. If the samples exhibit a focusing effect, a precise alignment with respect to the beam of radiation is generally required so that the rays of radiation impinge on the sample at as close an angle to normal as possible. This is particularly difficult if the containers have curved surfaces for the reasons mentioned above.

It is, therefore, an object of this invention to provide a new and improved apparatus for directing a beam of radiation on a test sample included within a temperature controlled sample chamber.

It is also an object of this invention to provide new and improved optical apparatus for directing a beam of radiation on a test sample in a manner to minimize the focusing effect of the test sample.

It is still a further object of this invention to provide new and imporved optical apparatus for directing a beam of radiation on a temperature controlled liquid test sample in a manner to minimize the focal effects of the liquid test sample and container thereby providing for a wider tolerance in the mechanical alignment of the test sample within the beam.

It is still a further object of this invention to provide new and improved optical apparatus for focusing a beam of radiation on a liquid test sample within a temperature controlled sample chamber that is particularly adapted to the automatic testing of liquid samples.

Apparatus for directing a beam of radiation through a test sample according to the present invention includes means providing a liquid bath mounted between a source of radiation and a radiation sensitive device, said means being adapted to receive a test sample container so that at least a portion of the container is immersed in the liquid bath. The test sample container and the liquid bath are essentially transparent at the wavelength of radiation at which the sample is to be tested. The liquid may, for example, comprise water controlled to a preset temperature. Optical means are provided for directing a beam of radiation through both the liquid bath and the container to said radiation sensitive device reducing the focal effects of the sample container and contents on the applied beam of radiation.

A further feature includes a collective lens formed as a portion of the means containing the liquid bath thereby reducing the loss in beam intensity due to reflection.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

FIG. 1 is an illustration of a photometer including an embodiment of the optical apparatus of the invention;

FIG. 2 is a cross-section of the photometer of FIG. 1 taken along the line 2—2;

FIG. 3 is an optical schematic diagram of a portion of the photometer of FIG. 1;

FIG. 4 is a block diagram of a temperature control system for the liquid bath of the photometer of FIG. 1.

When observing kinetic reactions which are highly temperature sensitive, it is necessary to maintain the temperature of the ingredients reflected and the reaction environment constant so that the reaction rate is primarily a function of the ingredients therein and not a function of temperature. In many cases the temperature has to be maintained at an accuracy in the order of ±0.1° C. This is particularly true at the time of the measurement when the sample being observed must remain at the control temperature so as not to introduce any error due to temperature effects. Chambers wherein the atmosphere (air) is held at a fixed temperature, generally may have variations in the order of two or three degrees centigrade. Metal heat blocks can be controlled to precise temperatures, but are expensive and generally introduce problems when attempting to automate a system utilizing such elements. For example, the block must accept the largest sample tube or cuvette and are, therefore, built with an opening having maximum tolerance. As a result, very little physical contact between the block and the sample tube may result when an undersized tube is employed. These problems have been overcome by utilizing apparatus embodying the invention wherein the sample is included in a temperature controlled bath and the radiation is applied through the bath and the test sample while making the measurements.

FIG. 1 is an illustration of chemical analyzing apparatus 10 having a rotatable turntable 12 with plurality of openings 14 for receiving test tubes or cuvettes 16 which hold the samples to be tested. The test tubes 16, including the samples, are adapted to be consecutively rotated into a radiation testing compartment 18 (shown by dashed lines) for testing thereof. The test tubes 16 extend through the turntable 12 into a toroidally-shaped compartment 20 containing a temperature controlled liquid therein to maintain the samples in the test tubes at a substantially constant temperature.

As viewed at FIG. 2, the turntable 12 is mounted to rest on a base 19 and includes an extended shaft 22 which is coupled to the shaft 24 of a commercially available slow speed motor 28. When the motor 28 is energized, the turntable 12 is driven until a tooth of a gear 30 (coupled to the shaft 24) engages the roller 32 of a snap action switch 34. The snap action switch 32 inactivates the motor 28 when one of the test tubes 16 is centered approximately in the test position of the compartment 18. The test tubes 16 are resiliently held in place by a spring clip 36 so that as the turntable is rotated clockwise (in the direction of the arrow 38 in FIG. 1) the test tube is accurately aligned in the test position of the compartment 18 by the action of a V notch guide 40 and a spring lever device 42. As the turntable 12 is rotated, the test tube 16 slides along the surface 44 of the guide 40 and into engagement with the spring lever device 42. The force of the test tube 16 causes the lever portion 46 of the lever device 42 to pivot about a pin 48 against the restraining action of a spring 50 so that the test tube can slip into the V notch 52. The spring lever device 42 then pivots back to maintain the test tube in the center of the V notch 52.

FIG. 3 is an optical diagram of an embodiment of the compartment 18 of FIG. 1. The testing compartment 18 includes a source of radiation 54 for providing two beams of radiation. A lamp 56 is included within a hollow cylindrical inner portion 58 of a rectangular shaped block 60 having two exit slits 62 and 64 spaced at an angle of 90° with respect to the axis of the cylindrical inner portion 58. A beam switch, illustrated a a rotatable cylindrical shutter 66, is mounted in coaxial relation to the inner portion 58 and is formed with two diametrically disposed slots 68 and 70 exhibiting an angle in the order of 90°. The solid portions of the shutter 66 are darkened for purposes of illustration. The optical shutter 48 is adapted to be rotated at a constant speed by a motor (not shown) to allow alternate beams of radiation to emerge from the block 54. If the shutter 66 is driven at 1800 r.p.m., a pair of 60 cycle chopped beams is available 180° out of phase with each other.

For purposes of illustration, the beam emerging from the exit slit 62 is designated as the reference beam 72, while the beam emerging from the exit slit 64 is designated as the sample beam 74. The reference beam 72 is reflected by a mirror 76 to pass through a collimating lens 78, a filter 80, a condenser lens 82 (formed as a portion of the compartment 20) the liquid bath 21 and a filter 84 (also forming a portion of the compartment 20) to a photomultiplier tube 86. The sample beam 74 passes through a fixed wedge 88, a movable occluder 90, a movable wedge 82 and is reflected from a mirror 94 to pass through a collimating lens 96, a filter 98, a condenser lens 100 (forming a portion of the compartment 20), a sample test tube 16, the filter 84, and the photomultiplier tube 86. Mounted adjacent to the reference beam exit slit 62 is a manual set apparatus 102, such as a movable jaw, that is adjusted during initial alignment to the radiation level that permits the testing of the most absorbent sample expected to be tested. The operation of the optical testing compartment 18 is fully explained in a copending application Ser. No. 529,852, now U.S. Pat. No. 3,418,484, invented by Duane D. Harmon, one of the present inventors and assigned to the same assignee of the present application. Although the sample compartment 18 of the present invention has been described with regard to a double beam photometer, it is to be understood, however, that the advantages of the invention will be applicable to single chopped or continuous beam of radiation.

The liquid 21 in the compartment 20 is adapted to be temperature controlled by the recirculating system as illustrated in FIG. 4. The liquid in the compartment 20 is pumped through a heater-cooler chamber 104 and back to the compartment 20 by a circulating pump 106. The heater-cooler chamber 104 can be a conventional commercially available unit having the amount of heat applied thereto or removed therefrom controlled by a conventional temperature control device 108.

The advantages of the invention will be described with regard to FIGS. 2 and 3. As illustrated in the figures, the condensing lenses 82 and 100 and the filter 84 are mounted to form a part of the toroidal shaped container 20. The beams of radiation 72 and 74 pass directly through the lenses 82 and 100 respectively, into the liquid 21. The index of refraction of the liquid 21 more closely approaches the index of refraction of the lenses 82 and 100 than does air so that the amount of radiation loss due to reflection between the lens and the liquid 21 interface is less than that if the lens were mounted in air, thereby resulting in a higher intensity beam. In addition, the lens effect of test tube and sample therein is also reduced. For example, if testing blood enzymes, the sample solution approaches the index of refraction of water. With the test sample and the water bath having approximately the same index of refraction and with the index of refraction of water approaching that of the glass test tube (as compared to air), the defocusing of the beam 74, due to the sample test tube 16 and sample therein, is substantially less than that of the test tube in air alone. By reducing the lens effect, the sample test tube 16 can be positioned within the sample compartment 18 with a greater degree of tolerance than that if the test tube would be so aligned in air.

We claim:
1. Apparatus for efficiently directing a beam of radiation through a test sample comprising:
 (a) a radiation transparent sample container for retaining a quantity of test sample;

(b) a chamber for retaining a quantity of liquid therein having a radiation path defined therein through said chamber and said liquid;

(c) means for receiving said sample container, said receiving means being located within said chamber so that at least a portion of said sample container and its contents is immersed in said liquid in said radiation path;

(d) a source of radiation;

(e) optical means having an optical axis and positioned to intercept at least some of the radiation emanating from said source for directing a beam of radiation along said radiation path on said optical axis;

(f) means for urging said sample container into precise alignment with said optical axis of said beam so that said optical axis intersects said sample container perpendicular to a tangent drawn at each point of intersection between said beam axis and said sample container, said means for urging said test sample container into precise alignment with said optical axis of said beam further comprising (i) a sample container guide having a V shaped notch cut therein mounted in said radiation path so that the center of said notch lies in the plane which perpendicularly intersects said optical axis; and (ii) a pivotally mounted resiliently biased lever for normally urging said sample container into said notch in said sample container guide;

(g) radiation sensitive means for generating a signal indicative of the radiation impinging thereupon positioned on said optical axis to intercept said beam of radiation after said beam has passed through said immersed portion of said sample container; and (h) a meter connected to said radiation sensitive means for measuring said signal.

2. The apparatus as defined in claim 1 wherein said liquid has an index of refraction which approaches that of said sample container.

3. The apparatus as defined in claim 1 wherein said liquid has an index of refraction which approaches that of said test sample.

4. The apparatus as defined in claim 1 wherein said liquid and said sample container have indexes of refraction which approach the index of refraction of said test sample.

5. The apparatus as defined in claim 1 which additionally comprises means for maintaining said liquid at a constant temperature.

6. The apparatus as defined in claim 1 wherein said optical means comprises:

(a) a collective lens mounted in said chamber to intersect said beam of radiation before it passes through said sample container; and (b) an optical filter mounted in said chamber to intersect said beam of radiation after it passes through said sample container.

References Cited

UNITED STATES PATENTS

| | | | |
|---|---|---|---|
| 2,157,438 | 5/1939 | Sparks | 356—208 |
| 3,328,502 | 6/1967 | Robson. | |

RONALD L. WIBERT, Primary Examiner

W. A. SKLAR, Assistant Examiner

U.S. Cl. X.R.

250—218; 356—39, 180, 184, 188

UNITED STATES PATENT OFFICE
CERTIFICATE OF CORRECTION

Patent No. 3,540,808          Dated November 17, 1970

Inventor(s) Duane D. Harmon and James M. Thoburn

It is certified that error appears in the above-identified patent and that said Letters Patent are hereby corrected as shown below:

Col. 3, line 72, after "illustrated" change "a" to -- as --
Col. 4, line 18, change "82" to -- 92 --

Signed and sealed this 1st day of June 1971.

(SEAL)
Attest:

EDWARD M. FLETCHER, JR.          WILLIAM E. SCHUYLER, JR.
Attesting Officer                Commissioner of Patents